United States Patent
Chang et al.

(10) Patent No.: US 10,071,524 B2
(45) Date of Patent: Sep. 11, 2018

(54) PRINTING METHOD FOR PRINTING MULTI-MATERIAL 3D MODEL

(71) Applicants: XYZPRINTING, INC., New Taipei (TW); KINPO ELECTRONICS, INC., New Taipei (TW)

(72) Inventors: Yu-Chuan Chang, New Taipei (TW); Kwan Ho, New Taipei (TW); Yang-Teh Lee, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 175 days.

(21) Appl. No.: 15/146,808

(22) Filed: May 4, 2016

(65) Prior Publication Data

US 2017/0259509 A1   Sep. 14, 2017

(30) Foreign Application Priority Data

Mar. 9, 2016   (CN) .......................... 2016 1 0131267

(51) Int. Cl.
G06F 17/50 (2006.01)
G06F 19/00 (2018.01)
(Continued)

(52) U.S. Cl.
CPC .......... B29C 64/336 (2017.08); B29C 31/045 (2013.01); B29C 64/106 (2017.08);
(Continued)

(58) Field of Classification Search
CPC ... B29C 31/045; B29C 64/106; B29C 64/112; B29C 64/118; B29C 64/336;
(Continued)

(56) References Cited

U.S. PATENT DOCUMENTS

2006/0127153 A1* 6/2006 Menchik ............... B29C 64/112
400/62
2011/0104643 A1* 5/2011 Giordano ............. B29C 64/106
433/203.1

(Continued)

FOREIGN PATENT DOCUMENTS

| CN | 104690967 A | 6/2015 |
| TW | M496561 U | 3/2015 |
| TW | 201522090 A | 6/2015 |

OTHER PUBLICATIONS

Office Action dated May 8, 2017 of the corresponding Taiwan patent application.

(Continued)

*Primary Examiner* — Leo B Tentoni
(74) *Attorney, Agent, or Firm* — Chun-Ming Shih; HDLS IPR Services

(57) ABSTRACT

A printing method for printing a multi-material 3D model comprises the following steps: perform a slicing process on a multi-material 3D object to generate the multi-material object slices and the object slices of a useful object; compute a material-switching point and a retrieving point during the slicing process; print the multi-material object slices of a multi-material 3D model with one of the materials; when print to the material-switching point, switch to another different material and print useful objects with the material used before the material switching; when print to the retrieving point, print the multi-material object slices with the material used after the material switching; and repeat the above steps until completing the multi-material 3D model printing. The present disclosed example prints the useful object via the remaining materials after the material switching which effectively reduces the cost with of multi-materials printing.

18 Claims, 12 Drawing Sheets

(51) Int. Cl.
| | |
|---|---|
| *B29C 64/336* | (2017.01) |
| *B29C 64/393* | (2017.01) |
| *B29C 64/40* | (2017.01) |
| *B29C 64/112* | (2017.01) |
| *B29C 64/35* | (2017.01) |
| *B29C 31/04* | (2006.01) |
| *B29C 64/118* | (2017.01) |
| *B29C 67/00* | (2017.01) |
| *B29C 64/106* | (2017.01) |
| *B29C 64/386* | (2017.01) |
| *B33Y 10/00* | (2015.01) |
| *B33Y 40/00* | (2015.01) |
| *B33Y 50/02* | (2015.01) |
| *B29K 55/02* | (2006.01) |
| *B29K 67/00* | (2006.01) |
| *B29L 22/00* | (2006.01) |
| *B29L 31/60* | (2006.01) |

(52) U.S. Cl.
CPC .......... *B29C 64/112* (2017.08); *B29C 64/118* (2017.08); *B29C 64/35* (2017.08); *B29C 64/386* (2017.08); *B29C 64/393* (2017.08); *B29C 64/40* (2017.08); *B29C 67/0055* (2013.01); *B29C 67/0088* (2013.01); *B29C 67/0092* (2013.01); *B29C 67/0096* (2013.01); *B29K 2055/02* (2013.01); *B29K 2067/046* (2013.01); *B29K 2995/0021* (2013.01); *B29L 2022/00* (2013.01); *B29L 2031/608* (2013.01); *B33Y 10/00* (2014.12); *B33Y 40/00* (2014.12); *B33Y 50/02* (2014.12)

(58) Field of Classification Search
CPC ..... B29C 64/35; B29C 64/386; B29C 64/393; B29C 64/40; B33Y 10/00; B33Y 50/00; B33Y 50/02; G06F 17/50; G06F 19/00
USPC .... 264/39, 40.1, 255, 308; 700/98, 118, 119
See application file for complete search history.

(56) References Cited

U.S. PATENT DOCUMENTS

| | | | |
|---|---|---|---|
| 2014/0034214 A1* | 2/2014 | Boyer | B33Y 10/00 156/73.2 |
| 2014/0070461 A1* | 3/2014 | Pax | B29C 64/386 264/401 |
| 2014/0277661 A1* | 9/2014 | Amadio | B29C 64/106 700/119 X |
| 2015/0142159 A1 | 5/2015 | Chang | |
| 2015/0158254 A1 | 6/2015 | Chang | |
| 2015/0190967 A1 | 7/2015 | Stava et al. | |
| 2015/0251357 A1* | 9/2015 | Jin | B29C 64/106 700/119 |

OTHER PUBLICATIONS

Office Action issue by European Patent Office dated Feb. 16, 2017.

* cited by examiner

PRINTING METHOD FOR PRINTING MULTI-MATERIAL 3D MODEL

BACKGROUND OF THE INVENTION

Technical Field

The technical field relates to a 3D model printing method and in particular relates to a printing method for printing a multi-material 3D model.

Description of Prior Art

The multi-color 3D printers based on Fused Deposition Modeling (FDM) technologies use a single nozzle with various color pigments to perform multi-color printing.

In an example of two color printing, after a printer uses the first color pigment to print the first color portion in a multi-color 3D model, the printer switches from the first color pigment to the second color pigment of other colors. Next, the printer has to moves the nozzle to a location away from the multi-color 3D model to remove and discard the remaining material of the first color pigments in the pipe and nozzle to assure that colors are not mixed. When the remaining material is totally removed, the printer then print the second color portion of the multi-color 3D model with the second color pigments . . . and so on. Accordingly, the multi-color 3D printer generates a multi-color 3D model.

In the above methods for printing multi-color 3D model, a large amount of remaining material is discarded in each color change, and the discarded remaining material cannot be used again which generates more wasted color pigments and higher printing cost.

SUMMARY OF THE INVENTION

The disclosure is directed to provide a printing method for printing a multi-material 3D model, which effectively uses remaining materials of materials in the following printing tasks.

One of the exemplary embodiments, a printing method for printing a multi-material 3D model comprises following steps:

a) performing a slicing process on a multi-material 3D object to generate a plurality of multi-material object slices corresponding to a main body structure of a multi-material 3D model and a plurality of auxiliary object slices corresponding to an auxiliary structure of the multi-material 3D model;

b) computing at least one material-switching point of the multi-material object slices and at least one retrieving point of the auxiliary object slices during the slicing process;

c) printing the multi-material object slices with one of a plurality of materials;

d) when printing to the material-switching point of the multi-material object slices, switching to another different material, and printing the auxiliary object slices with a remaining material of the material used before the material switching;

e) when printing to the retrieving point of the auxiliary object slices, continuing to print the multi-material object slices from the material-switching point of the multi-material object slices with the material used after the material switching; and f) repeating the step d and the step e until completing the multi-material 3D model printing.

Preferably, the auxiliary structure is an internal supporting structure or an external supporting structure of the multi-material 3D model.

Preferably, the step a comprises following steps:

a1) obtaining the multi-material 3D object;

a2) performing the slicing process on the multi-material 3D object to generate the multi-material object slices and the auxiliary object slices; and a3) sending a warning when determining a total quantity estimate of the remaining material exceeds total quantity estimate of the material of the auxiliary object slices.

Preferably, the step b comprises following steps:

b1) computing the material-switching points of the multi-material object slices, wherein the material-switching points corresponds to the junctions of a plurality of portions of the multi-material object slices, the adjacent portions respectively corresponds to the materials of different colors or the materials of different composing materials;

b2) computing the retrieving points of the auxiliary object slices according to an estimated remaining material quantity, wherein the retrieving points respectively corresponds to the material-switching points; and b3) computing a printing path going through the material-switching points and the retrieving points.

Preferably, the step c comprises a step c1: controlling a nozzle to print the multi-material object slices along the printing path; the step d comprises a step d1: when the nozzle moving to one of the material-switching points along the printing path, switching to another different material, moving the nozzle to the corresponding retrieving point along the printing path, and controlling the nozzle to print the auxiliary object slices along the printing path with the remaining materials of the materials used before the material switching.

Preferably, the step e comprises a step e1: when the nozzle moving to another retrieving point along the printing path, moving the nozzle along the printing path to the material-switching point upon the material switching, and continuing to print the multi-material object slices along the printing path with the materials after the material switching.

Preferably, the step c is determining the material corresponding to one of a plurality of portions of the multi-material object slices, and printing the corresponding portion of the multi-material object slices with the materials along a printing path determined during the slicing process, the printing path going through the material-switching point and the retrieving point; the step e is continuing to print another portion of the same multi-material object slices along the printing path.

Preferably, the step d comprises following steps:

d2) when printing to the material-switching point of the multi-material object slices along the printing path, switching to another material corresponding to another portion of the same multi-material object slice; and d3) printing the auxiliary object slice of the same slice height along the printing path with the remaining materials of the materials used before the material switching.

Preferably, the step d further comprises a step d4: when the remaining materials of the materials used before the material switching runs out and the printing of the auxiliary object slice is not completed, continuing to print the auxiliary object slice along the printing path with the materials after the material switching.

Preferably, the method comprises a step e0 before the step e: performing scraping for removing the remaining material of a nozzle on the printed auxiliary object slices along a printing path determined during the slicing process.

Another one of the exemplary embodiments, a printing method for printing a multi-material 3D model comprises following steps:

a) performing a slicing process on a multi-material 3D object and an subordinate 3D object respectively to generate a plurality of multi-material object slices corresponding to a multi-material 3D model and a plurality of subordinate object slices corresponding to a subordinate 3D model;

b) computing at least one material-switching point of the multi-material object slices and at least one retrieving point of the subordinate object slices during the slicing process;

c) printing the multi-material object slices with one of a plurality of materials;

d) when printing to the material-switching point of the multi-material object slices, switching to another different material, and printing the subordinate object slices with a remaining material of the material used before the material switching;

e) when printing to the retrieving point of the auxiliary object slices, continuing to print the multi-material object slices from the material-switching point of the multi-material object slices with the material used after the material switching; and f) repeating the step d and the step e until completing the multi-material 3D model printing Preferably, the multi-material 3D object is a hollow object; the step a is installing the subordinate object slice inside the multi-material object slice.

Preferably, the step a is individually installing the subordinate object slices on the outside of the multi-material object slices.

Preferably, the step b comprises following steps:

b1) computing the material-switching points of the multi-material object slices, wherein the material-switching points corresponds to the junctions of a plurality of portions of the multi-material object slices, the adjacent portions respectively corresponds to the materials of different colors or the materials of different composing materials;

b2) computing the retrieving points of the subordinate object slices according to an estimated remaining material quantity, wherein the retrieving points respectively corresponds to the material-switching points; and b3) computing a printing path going through the material-switching points and the retrieving points.

Preferably, the step c comprises a step c1: controlling a nozzle to print the multi-material object slices along the printing path; the step d comprises a step d1: when the nozzle moving to one of the material-switching points along the printing path, switching to another different material, moving the nozzle to the corresponding retrieving point along the printing path, and controlling the nozzle to print the subordinate object slices along the printing path with the remaining materials of the materials used before the material switching.

Preferably, the step e comprises a step e1: when the nozzle moving to another retrieving point along the printing path, moving the nozzle along the printing path to the material-switching point upon the material switching, and continuing to print the multi-material object slices along the printing path with the materials after the material switching.

Preferably, the step c is determining the material corresponding to one of a plurality of portions of the multi-material object slices, and prints the corresponding portion of the multi-material object slices with the materials along a printing path determined during the slicing process, the printing path going through the material-switching point and the retrieving point; the step e is continuing to print another portion of the multi-material object slices along the printing path.

Preferably, the step d comprises following steps:

d2) when printing to the material-switching point of the multi-material object slices along the printing path, switching to another material corresponding to another portion of the same multi-material object slice; and d3) printing the subordinate object slice of the same slice height along the printing path with the remaining materials of the materials used before the material switching.

Preferably, the subordinate 3D model is a model with receiving space; the step d further comprises a step d4: printing the walls of the subordinate 3D model along the printing path with the remaining materials of the materials used before the material switching, and when the printing of the subordinate 3D model completed, continuing to print the inside of the subordinate 3D model along the printing path.

Preferably, the method comprises a step e0 before the step e: performing scraping for removing the remaining material of a nozzle on the printed subordinate object slices along the printing path.

The present disclosed example effectively reduces the cost used in multi-material printing via printing useful objects after materials switching with the remaining materials.

BRIEF DESCRIPTION OF DRAWING

The features of the disclosed example believed to be novel are set forth with particularity in the appended claims. The disclosed example itself, however, may be best understood by reference to the following detailed description of the disclosed example, which describes an exemplary embodiment of the disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
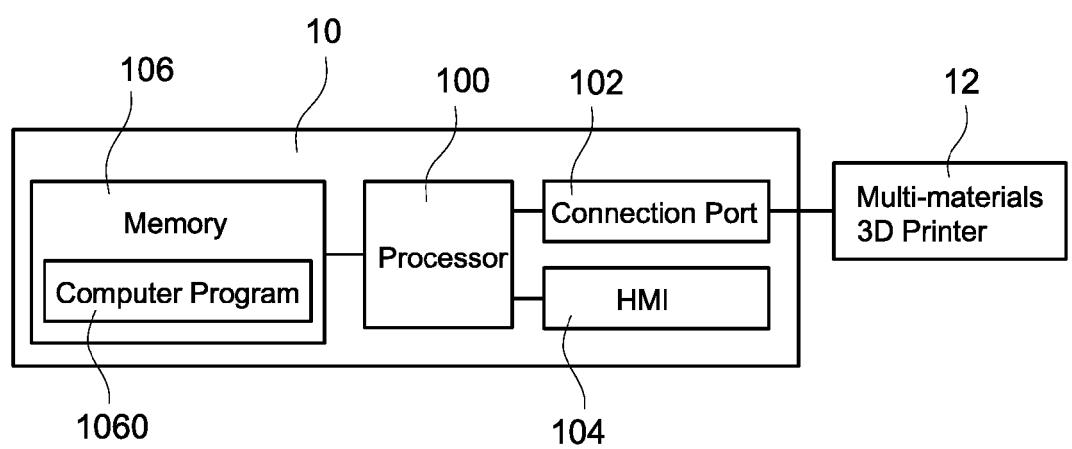
FIG. 1 is a 3D printing system schematic diagram of the first embodiment according to the present disclosed example.

FIG. 1 is a 3D printing system schematic diagram of the first embodiment according to the present disclosed example. FIG. 1 discloses a 3D printing system 1 (referred as the printing system 1 in the following) based on the present disclosed example. The printing system 1 comprises a computer device 10 and a Multi-material 3D printer 12.

The computer device 1 comprises a connection port 102 (for example a USB connection port) electrically connected to the Multi-material 3D printer 12, a human machine interface (HMI) 104 (for example, keyboard, mouse or touch control screen) used for accepting and outputting data, a memory 106 used for storing data, and a processor 100 electrically connected to above components and used for controlling the computer device 1. Preferably, the computer device 1 is a desk top computer, notebook computer, cloud server or smart phone, and the scope is not limited thereto.

Preferably, a computer program 1060 is saved in the memory 106. Executable codes are recorded in the computer program 1060. The printing method for printing a multi-material 3D model mentioned in each embodiment based on the present disclosed example is implemented via executing the computer program 1060 at the processor 100.

The Multi-material 3D printer 12 is used for printing a multi-material 3D model. Substantially, the Multi-material 3D printer 12 controls a nozzle to respectively print with a plurality of various materials to implement multi-material printing.

Specifically, the Multi-material 3D printer 12 respectively uses the materials of different colors (for example using red plastic filaments, blue plastic filaments and black plastic filaments) to implement multi-color printing. The Multi-material 3D printer 12 respectively uses the materials of different composing materials (such as using metallic filaments and plastic filaments) to complement multi-composing materials, or using different color and the materials of different composing materials (such as blue plastic filaments, black plastic filaments, silver metallic filaments and red metallic filaments) to complement multi-color and multi-composing materials printing.

Preferably, the Multi-materials 3D printer 12 is a FDM multi-color 3D printer, the plurality of materials is Acrylonitrile butadiene styrene (ABS) or polylactide (PLA), but the scope is not limited thereto.

Figure 2:
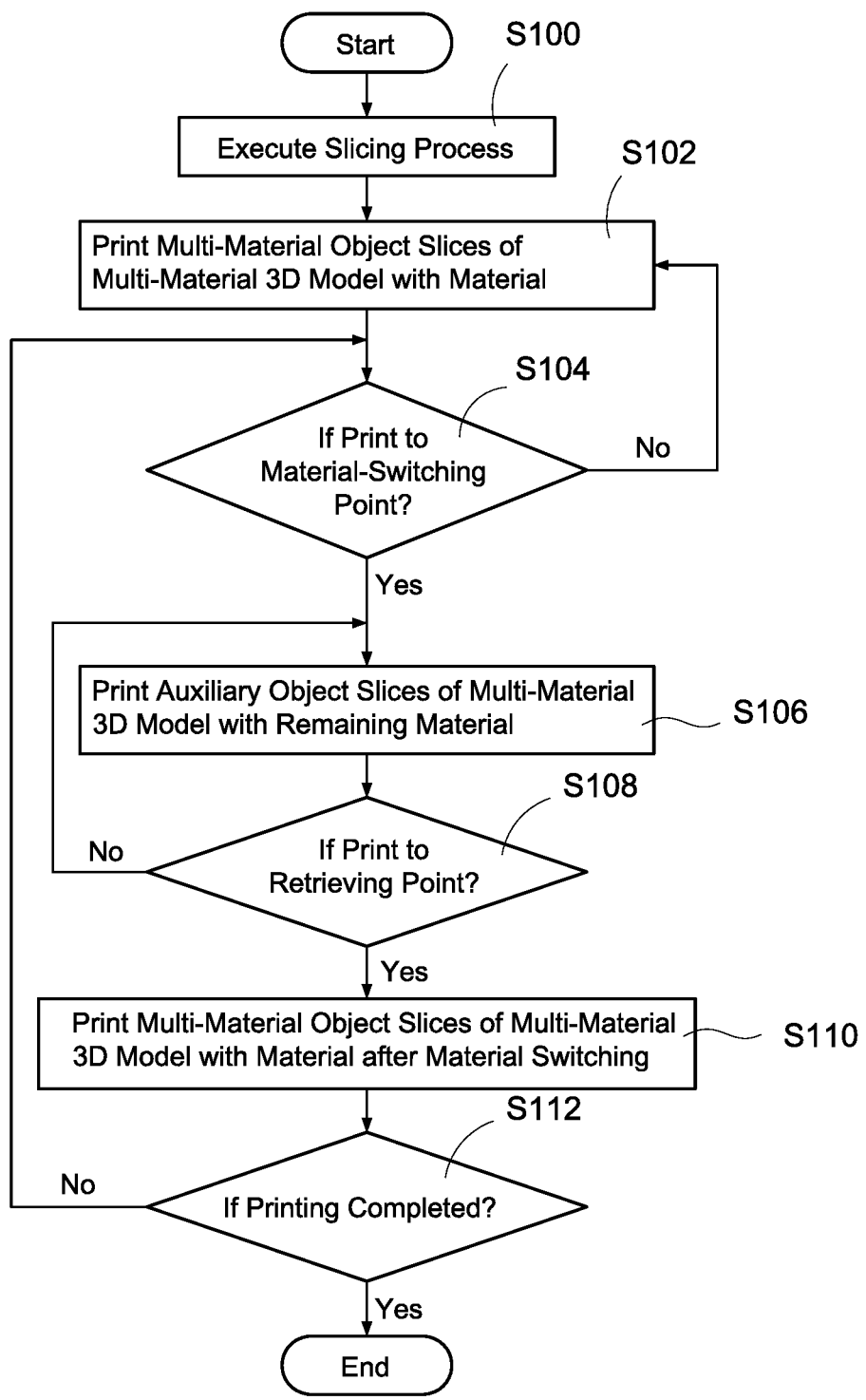
FIG. 2 is a flowchart of printing method for printing a multi-material 3D model of the first embodiment according to the present disclosed example.

FIG. 2 is a flowchart of printing method for printing a multi-material 3D model of the first embodiment according to the present disclosed example. Each embodiment of printing method for printing a multi-material 3D model (referred as the printing method) according to the present disclosed example is implemented via the printing system 1 shown in the FIG. 1. The printing method of the embodiment comprises following steps.

Step S100: the printing system 1 executes a slicing process a multi-material 3D object (for example a multi-color 3D object composed of various colors, a multi-composing materials 3D object composed of multiple materials or a multi-composing materials 3D object composed of various colors and multiple composing materials) to generate a plurality of multi-material object slices corresponding to the multi-material 3D model and a plurality of auxiliary object slices of an auxiliary structure corresponding to the multi-material 3D model, wherein the auxiliary object slice is an auxiliary structure (for example an internal supporting structure or an external supporting structure) corresponding to the multi-material 3D object.

Preferably, each multi-material object slice only corresponds to single material category (i.e. the multi-material object slice printing only uses material of single one category of material), or corresponds to a plurality of material categories (i.e. the multi-material object slice printing uses materials of a plurality of material categories), the scope is not limited thereto.

Preferably, the printing system 1 generates the auxiliary object slices during the slicing process, and combines the auxiliary object slices and the multi-material object slices to be the multi-material 3D model.

It should be noted that, the multi-material 3D object is based on virtual object data, and does not take in to account the physical forces applied on the materialized multi-material 3D object during the design process (such as gravity, material strength and viscosity or forming method). The multi-material 3D model has to add specific functions to the auxiliary structure in respond to the physical forces received in order to assure that the multi-material 3D model is successfully materialized (for example with 3D printing). In addition, because the auxiliary structure usually is not a part of the physical exterior (for example the external supporting structure is removable after forming, the internal supporting structure is within the model), the color or the composing materials of the auxiliary structure printed by a plurality of materials does not pose any impact on the exterior of the printed multi-material 3D model.

For example, the printing system 1 adds the external supporting structure on the ramp surface of the multi-material 3D model in order to avoid the failure caused by insufficient viscosity of the ramp surface material of the or lack of supporting points during forming process. Or, the printing system 1 adds the internal supporting structure of various filling percentage (for example 30%, 50% or 70%) or of different kinds (for example honeycomb, solid or mixed type) to dispose inside or on the walls of the multi-material 3D model in order to flexibly adjust the strength of the printed multi-material 3D model.

Figure 3:
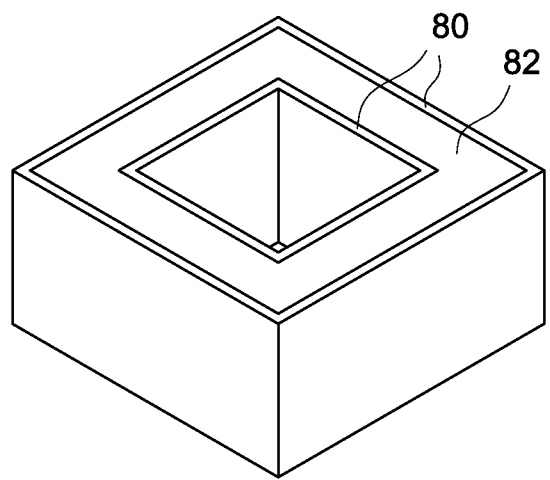
FIG. 3 is a first schematic diagram of a multi-material 3D model of the first embodiment according to the present disclosed example.

FIG. 3 is a first schematic diagram of a multi-material 3D model of the first embodiment according to the present disclosed example. As shown in the diagram, a plurality of auxiliary object slices 82 are disposed on the internal walls of a plurality of multi-material object slices 80 to be the internal supporting structure.

Figure 4:
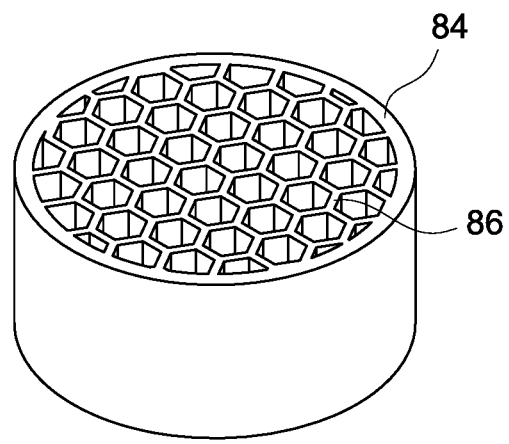
FIG. 4 is a second schematic diagram of a multi-material 3D model of the first embodiment according to the present disclosed example.

FIG. 4 is a second schematic diagram of a multi-material 3D model of the first embodiment according to the present disclosed example. As shown in the diagram, a plurality of auxiliary object slices 86 are disposed inside a plurality of multi-material object slices 84 to be a honeycomb internal supporting structure.

Figure 5:
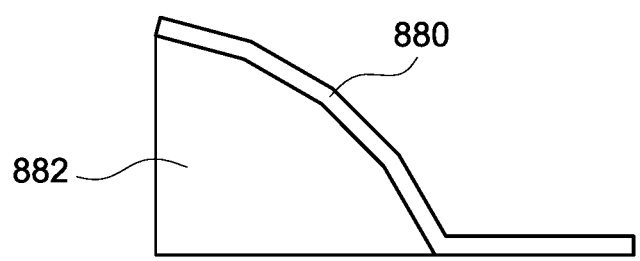
FIG. 5 is a third schematic diagram of a multi-material 3D model of the first embodiment according to the present disclosed example.

FIG. 5 is a third schematic diagram of a multi-material 3D model of the first embodiment according to the present disclosed example. As shown in the diagram, a plurality of auxiliary object slices 882 connect to the surface of a plurality of multi-material object slices 880, and serve as the supporting structure. Further, after the printing is completed, the external supporting structure can be removed.

Preferably, the printing system 1 further computes at least one material-switching point of the multi-material object slices (for example the first material-switching point) during the slicing process and at least one retrieving point of the auxiliary object slices (for example the first retrieving point).

Specifically, the material-switching point is disposed on the junctions between different materials of the multi-material object slices. In further details, in the following printing process, when the printing system 1 prints to the material-switching point of the multi-material object slice, switches to another material to continue print another portion of the multi-material object slices with different materials. In addition, the retrieving point corresponds to remaining material quantity generated by the corresponding switching materials. In other words, when the printing system 1 prints to the retrieving point of the auxiliary object slices, the remaining material generated by the material switching runs out.

Step S102: the printing system 1 selects one material from different materials (for example a first material), and uses the nozzle to print a plurality of multi-material object slices of the multi-material 3D model with the first material. Preferably, the printing system 1 prints a particular portion (for example a first portion) of the multi-material object slices, wherein the color or the composing materials of the first portion corresponds to color or the composing materials of the first material.

Step S104: the printing system 1 determines if the printing system 1 prints to the first material-switching point of the multi-material object slice. Specifically, the printing system 1 determines if the materials is required to switch to continue to print another portion (for example a second portion) of the multi-material object slices according to whether the printing system 1 prints to the first material-switching point. if the printing system 1 is determined to print to the first material-switching point, then switches to another material (for example a second material, the color or the composing materials of the second material corresponds to the color or the composing materials of the second portion on unprinted multi-material object slice), and execute Step S106. Or, repeat Step S102 in order to continue to print with the first material.

Step S106: the printing system 1 uses the nozzle to print a plurality of auxiliary object slices of the multi-material 3D model with the remaining material of the first material used before switching. Specifically, immediately after the materials switching, the pipe and the nozzle of the Multi-materials 3D printer 12 still has the remaining material of the first material left, the printing system 1 uses the remaining material of the first material and/or the second material to print the auxiliary object slices.

Thus, the present disclosed example makes effective use of the remaining materials after the material switching, and avoids wasted materials and higher printing cost caused by discarding remaining materials.

Step S108: the printing system 1 determines if the printing system 1 prints to the first retrieving point of the auxiliary object slice. Specifically, the printing system 1 determines if the remaining material of the first material runs out according to whether the printing system 1 prints to the first retrieving point. If the printing system 1 is determined to print to the first retrieving point, execute Step S110. Or, repeat the Step S106 to continue to print the auxiliary object slice with the remaining material of the first material.

Step S110: the printing system 1 uses the nozzle to continue to print the second portion of the multi-material object slices from the first material-switching point with the second material.

Step S112: the printing system 1 determines if the printing of the multi-material 3D model is completed (i.e. if the printing of all portions of the multi-material object slices is completed). If the result shows the printing is not completed, repeat the Step S104 to determine if switch to print another portion of the multi-material 3D model (for example a third portion) with another material (for example the first material or a third materials) according to whether the printing system 1 prints to the next material-switching point (for example second material-switching point). Or, the printing method ends.

The method base on the present disclosed example prints the auxiliary structure of the same object with the remaining material after the material switching, which effectively lowers, the cost of the multi-material printing.

Figure 6A:
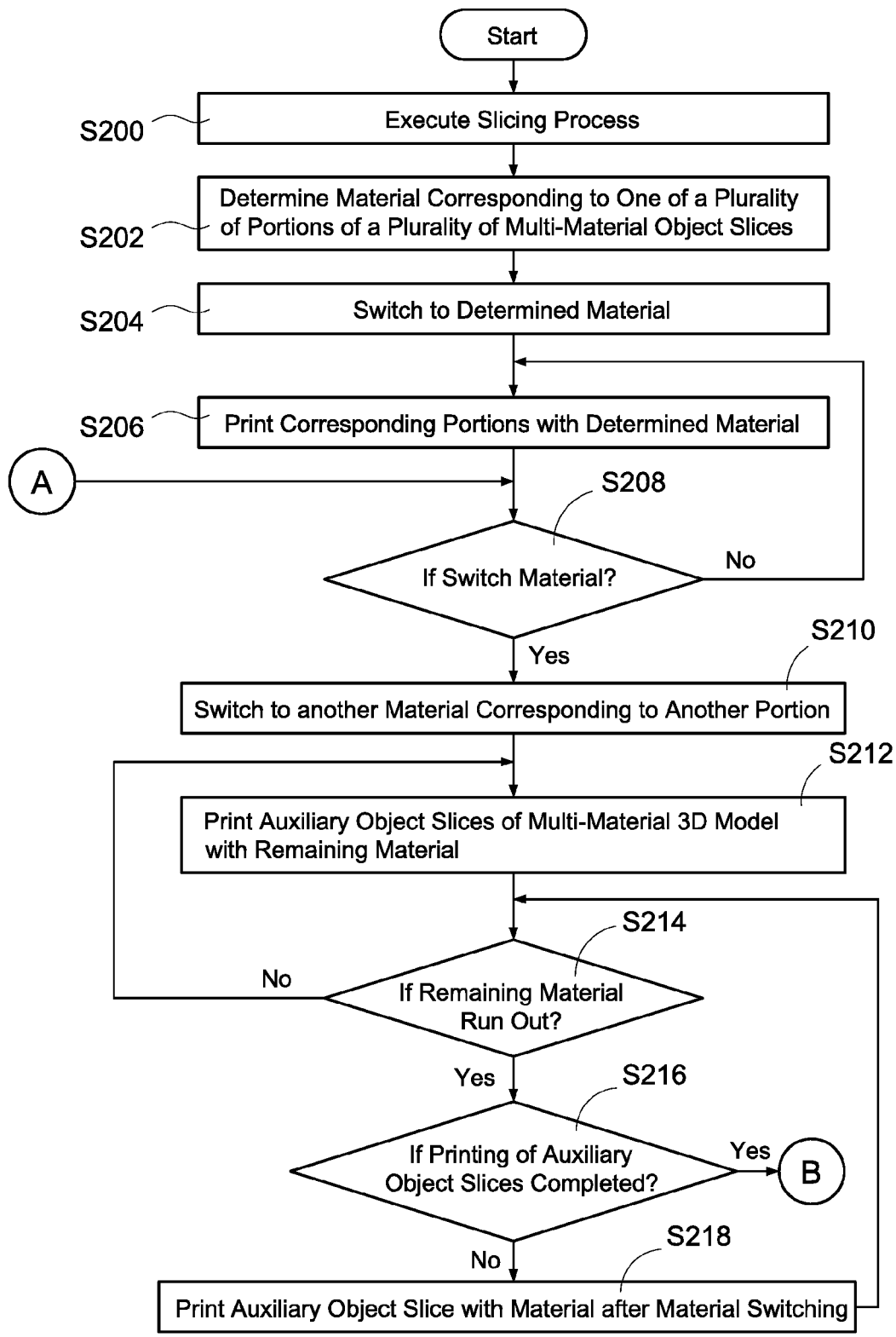
FIG. 6A is a first flowchart of printing method for printing a multi-material 3D model of the second embodiment according to the present disclosed example.
Figure 6B:
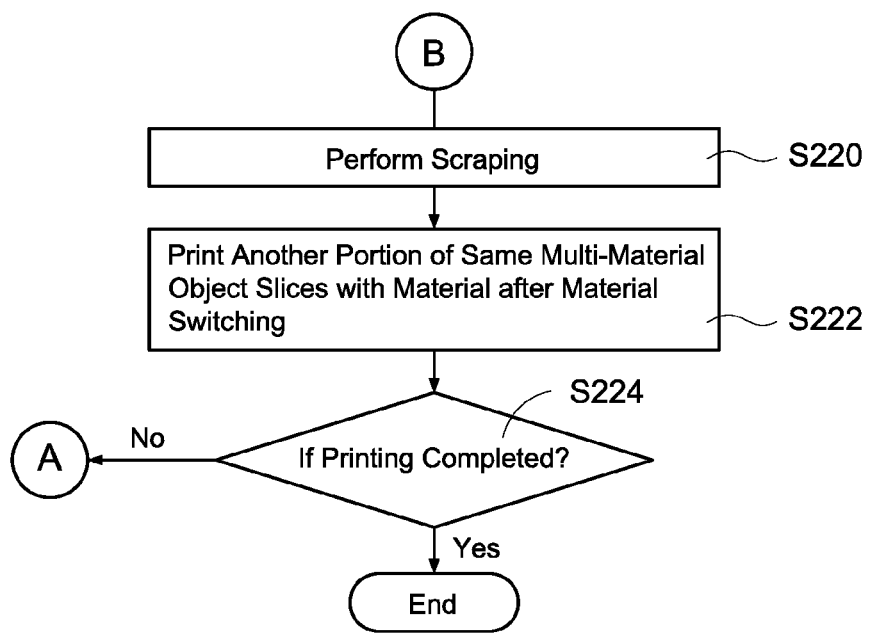
FIG. 6B is a second flowchart of printing method for printing a multi-material 3D model of the second embodiment according to the present disclosed example.

Refer to FIG. 6A and FIG. 6B, FIG. 6A is a first flowchart of printing method for printing a multi-material 3D model of the second embodiment according to the present disclosed example and FIG. 6B is a second flowchart of printing method for printing a multi-material 3D model of the second embodiment according to the present disclosed example. The printing method of the embodiment comprises the following steps.

Step S200: the printing system 1 performs the slicing process on the multi-material 3D object to generate the multi-material object slices corresponding to the multi-material 3D objects and the auxiliary object slices corresponding to the auxiliary structure. In addition, the printing system 1 computes a plurality of material-switching points of the multi-material object slices and a plurality of retrieving points of the auxiliary object slices during the slicing process, wherein the material-switching points respectively corresponds to the retrieving points.

Preferably, the printing system 1 further computes a printing path going through the material-switching points and the retrieving points during the slicing process. Preferably, the printing path is the moving path when the nozzle performs printing.

Step S202: the printing system 1 selects one of the multi-material object slices (for example the lowermost unprinted multi-material object slice), selects one of a plurality of portions of the multi-material object slice (for example a first portion), and determines which material to print (for example a first material) according to color or the composing materials corresponding to the first portion.

Step S204: the printing system 1 switches to the determined first material.

Step S206: the printing system 1 print the first portion of the multi-material object slice corresponding to the first material along the printing path with the first material.

Step S208: the printing system 1 determines if switches the material to continue to print another portion of the multi-material object slice (for example a second portion) via determining if the printing system 1 prints to one of the switching points (for example first switching point). If the determine result is switching materials, the printing system 1 switches to another material (for example a second material) corresponding to the color or the composing materials of the second portion, and executes Step S210. Or, repeats Step S206 to continue to print along the printing path with the first material.

Step S210: the printing system 1 switches to the second material corresponding to color or the composing materials of the second portion.

Step S212: the printing system 1 prints the auxiliary object slice with the remaining material of the first material and/or the second material. Preferably, the printing system 1 prints the multi-material object slices by slices and by materials and prints the auxiliary object slice of the same slice height from the retrieving point corresponding to the first switching point (for example first retrieving point) along the printing path with the remaining materials during the intervals of the material switching between the multi-material object slices.

Step S214: the printing system 1 determines if the remaining material of the first material runs out according to whether the printing system 1 prints to another retrieving point (for example second retrieving point) from the first retrieving point along the printing path. If yes, execute Step S216, if not, repeat Step S212.

Step S216: the printing system 1 determines if the printing of the auxiliary object slice with the same slice height is completed according to whether the printing system 1 prints to another retrieving point (for example third retrieving point) along the printing path. If yes, execute Step S220. Or, execute Step S218.

Specifically, if the printing system determines that an estimated remaining material quantity generated upon the material switching is not higher than an estimated material quantity required for printing a single slice of the auxiliary object slice during the slicing process, the printing system sets up the third retrieving point at the printing end point of the auxiliary object slice, instead of setting up the third retrieving point at the location where the remaining material of the first material runs out. Thus, the printing system 1 continues to print the auxiliary object slice along the printing path with the second material after the remaining material of the first material runs out.

Step S218: the printing system 1 completes the printing of the first portion of the multi-material object slice but the printing of the auxiliary object slice with the same slice height is not completed, continue to print the auxiliary object slice with the same slice height along the printing path with the second material. Next, repeat Step S214.

It should be noted that the Step S214-S218 of the embodiment are provided to assure the remaining material of the first material runs out and the printing of the required auxiliary object slices (for example the required external supporting structure, the solid internal supporting structure or the internal supporting structure with restricted filling percentage) are completed. In other embodiments, if the printing of the auxiliary object slices is not required to complete (for example the optional external supporting structure or the internal supporting structure with non-restricted filling percentage), the printing system 1 may execute Step S220 when determining the remaining material runs out (the determine result is yes in the Step S214).

Step S220: the printing system 1 performs scraping for removing the remaining material of a nozzle on the printed auxiliary object slices along a printing path determined during the slicing process. Preferably, the printing system 1 controls the nozzle to brush through the upper edge of the printed auxiliary object slice and use the upper edge of the printed auxiliary object slice to scrape the remaining material of the nozzle.

With the scraping, the remaining material of the nozzle is prevented from sticking to multi-material object slice and lead to defected look of the printed multi-material 3D model.

Step S222: the printing system 1 uses the nozzle to continue to print the second portion of the same multi-material object slice from the first switching point along the printing path with the second material.

Step S224: the printing system 1 determines if the printing of the multi-material 3D model is completed. If the printing is not completed, repeat the Step S208 to determine if switch to third materials to print the third portion of the multi-material object slice, or print another multi-material object slice. Or, the printing method ends.

Figure 7:
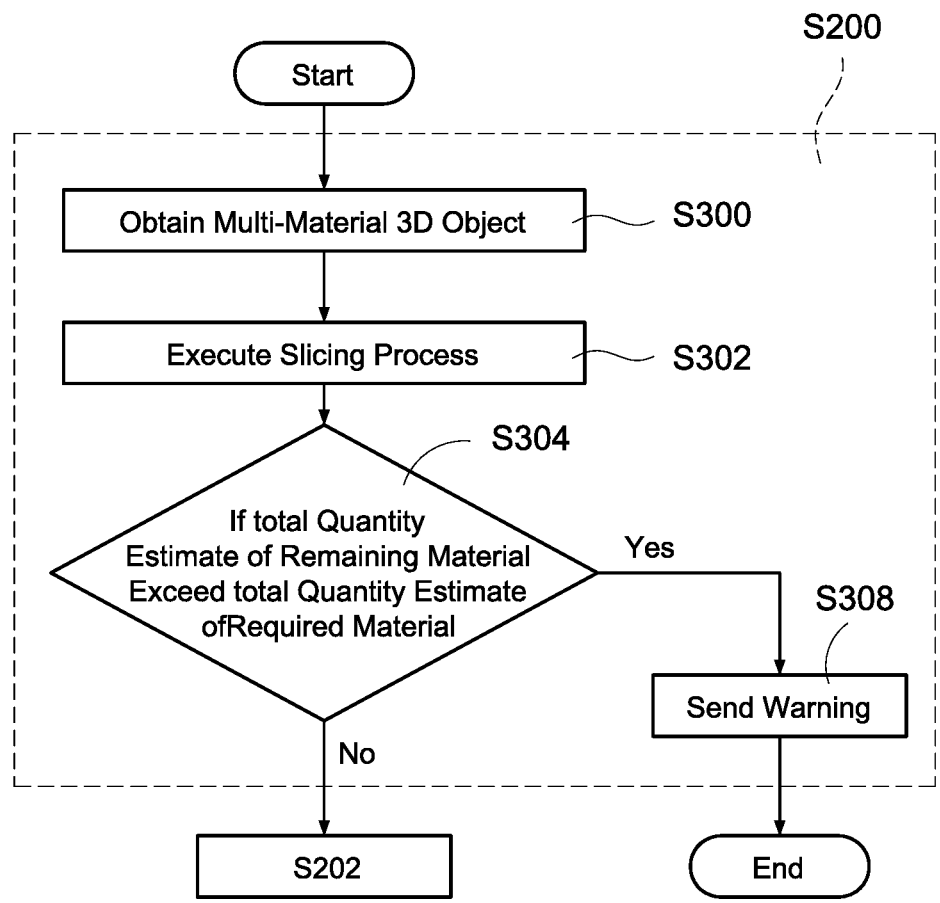
FIG. 7 is a partial flowchart of the printing method for printing a multi-material 3D model of the third embodiment according to the present disclosed example.

FIG. 7 is a partial flowchart of the printing method for printing a multi-material 3D model of the third embodiment according to the present disclosed example. Compare with second embodiment, Step S200 of the present embodiment further comprises the following steps.

Step S300: the printing system 1 obtains the multi-material 3D objects.

Step S302: the printing system 1 executes the slicing process on the multi-material 3D object to generate the multi-material object slices corresponding to the main body structure of the multi-material 3D model. In addition, the printing system 1 further determines if the multi-material 3D model is required to add the auxiliary structure during the slicing process. If the multi-material 3D model is required to add the auxiliary structure, the printing system 1 further generates the multi-material object slices corresponding to the required auxiliary structure, and combines the multi-material object slices and the auxiliary object slices to provide the multi-material 3D model with the auxiliary structure.

Preferably, after generates the multi-material object slices, the printing system 1 can further set up the colors, composing materials of each portion and/or the corresponding materials of the multi-material object slices.

Step S304: the printing system 1 computes a total quantity estimate of the remaining material and a total quantity estimate of the material (i.e. the total quantity estimate of the required material), and determines if the total quantity estimate of the remaining material exceeds the total quantity estimate of the required material, wherein the total quantity estimate of the remaining material is the estimated total quantity of the remaining material generated by switching materials during print the multi-material object slices, the total quantity estimate of the required material is the estimated total required quantity to print the auxiliary object slices. If determined exceeds, execute Step S308, or execute Step S202.

Step S308: the printing system 1 sends a warning via the human machine interface 104 and interrupts the slicing process. Preferably, the printing system 1 further instructs users to select other remaining material process settings (for example adapting the printing method of the fourth embodiment based on the present disclosed example).

Thus, the present disclosed example effectively avoids the printed multi-material 3D model from occurring materials mixture errors caused by in completely removing the remaining material.

Figure 8:
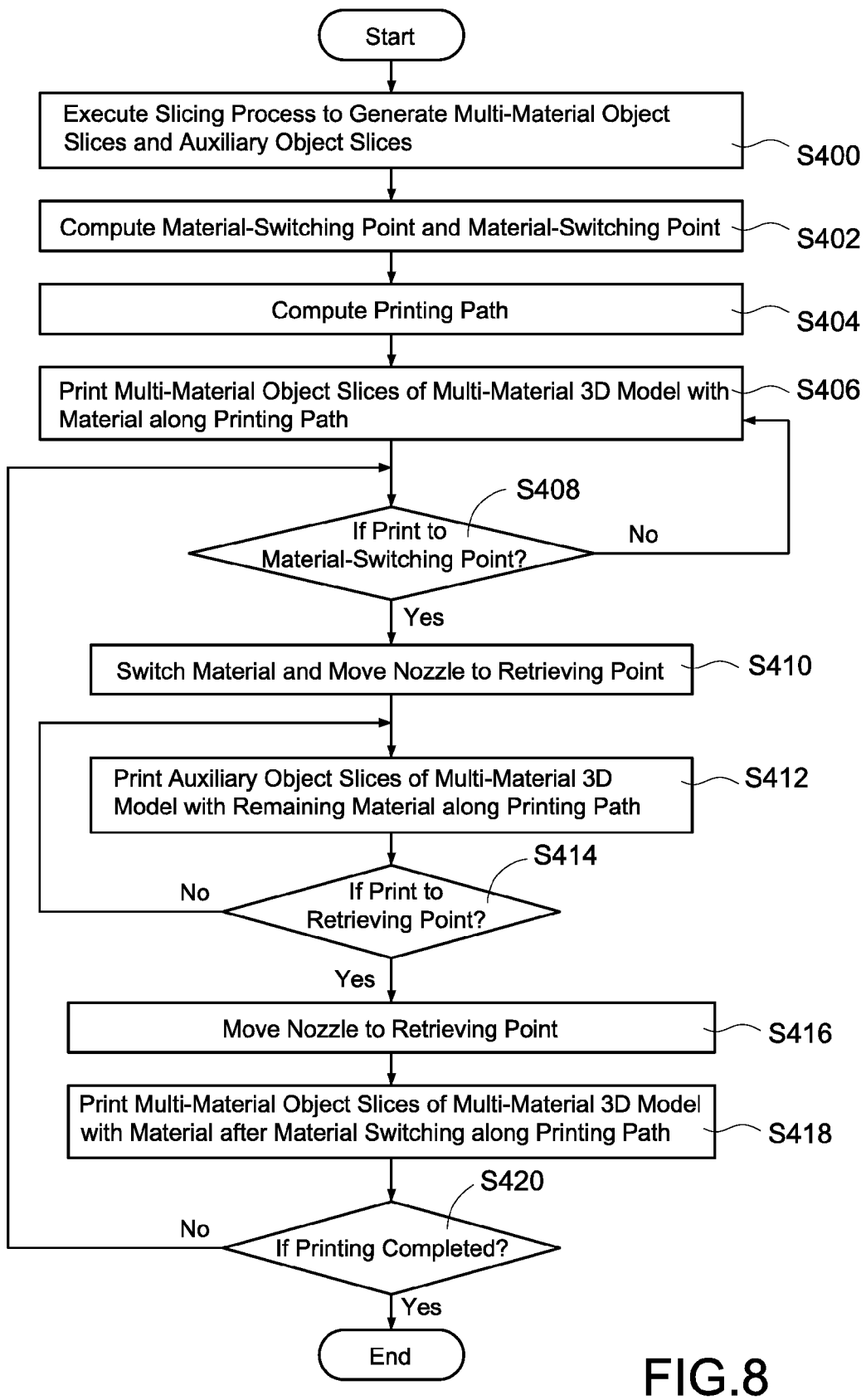
FIG. 8 is a flowchart of printing method for printing a multi-material 3D model of the fourth embodiment according to the present disclosed example.

FIG. 8 is a flowchart of printing method for printing a multi-material 3D model of the fourth embodiment according to the present disclosed example. The printing method of the embodiment comprises the following steps.

Step S400: the printing system 1 executes the slicing process to generate the multi-material object slices corresponding to the main body structure of the multi-material 3D model and the auxiliary object slices corresponding to the auxiliary structure of the multi-material 3D model.

Step S402: the printing system 1 computing the material-switching points of the multi-material object slices, wherein the material-switching points correspond the junctions of a plurality of portions of the multi-material object slices, the adjacent portions respectively correspond to the materials of different categories. In addition, the printing system 1 computes an estimated remaining material quantity upon the material switching, and computes the retrieving points of the auxiliary object slices where the remaining materials runs out according to the estimated remaining material quantity, wherein the retrieving points respectively corresponds to the material-switching points.

Step S404: the printing system 1 computes a printing path going through the material-switching points and the retrieving points. Preferably, the printing path is the moving path when the nozzle performs printing.

With the predetermined path planning, the printing system 1 smoothly without interruption moves the nozzle to the auxiliary structure in order to print with the remaining material when the remaining material generates, and when the remaining material runs out, the printing system 1 smoothly without interruption moves the nozzle to the main body structure to print with the correct materials.

Step S406: the printing system 1 controls the nozzle to print the multi-material object slices with the first material along the printing path.

Step S408: the printing system 1 determines if the nozzle prints and moves to one of the material-switching points (for example the first material-switching point) along the printing path. If yes, execute Step S410. Or, repeat Step S406.

Step S410: the printing system 1 switches to the different second material from the first material, and moves the nozzle to one of the retrieving points of the auxiliary object slices according to the printing path. Preferably, the printing system 1 moves the nozzle to the retrieving point corresponding to the first material-switching point (for example the first retrieving point).

Step S412: the printing system 1 controls the nozzle to print the auxiliary object slices with the remaining material of the first the material used before the material switching along the printing path.

Step S414: the printing system 1 determines if the nozzle prints to and moves to another retrieving point of the printing path (for example second retrieving point). If yes, execute Step S416. Or, repeat Step S412.

Step S416: the printing system 1 determines the nozzle moves to the second retrieving point, the printing system 1 moves the nozzle back to the first material-switching point where the material was switched.

Step S418: the printing system 1 continues to print the multi-material object slices with the second material after the material switching along the printing path.

Step S420: the printing system 1 determines if the printing of the multi-material 3D model is completed (i.e. if the nozzle completes printing and moving along the printing path). If the printing is determined not finished, repeat the Step S408. Or, the printing method ends.

In the abovementioned first embodiment, the second embodiment, the third embodiment and fourth embodiment, the printing system 1 uses the remaining materials for printing the auxiliary structure of the multi-material 3D model, yet the scope is not limited thereto. The printing system 1 may also uses the remaining materials to print other useful objects, for example in other embodiments according to the present disclosed example (for example the fifth embodiment, sixth embodiment, seventh embodiment and eighth embodiment in the following), the printing system 1 uses the remaining material to print another multi-material 3D model.

Figure 9:
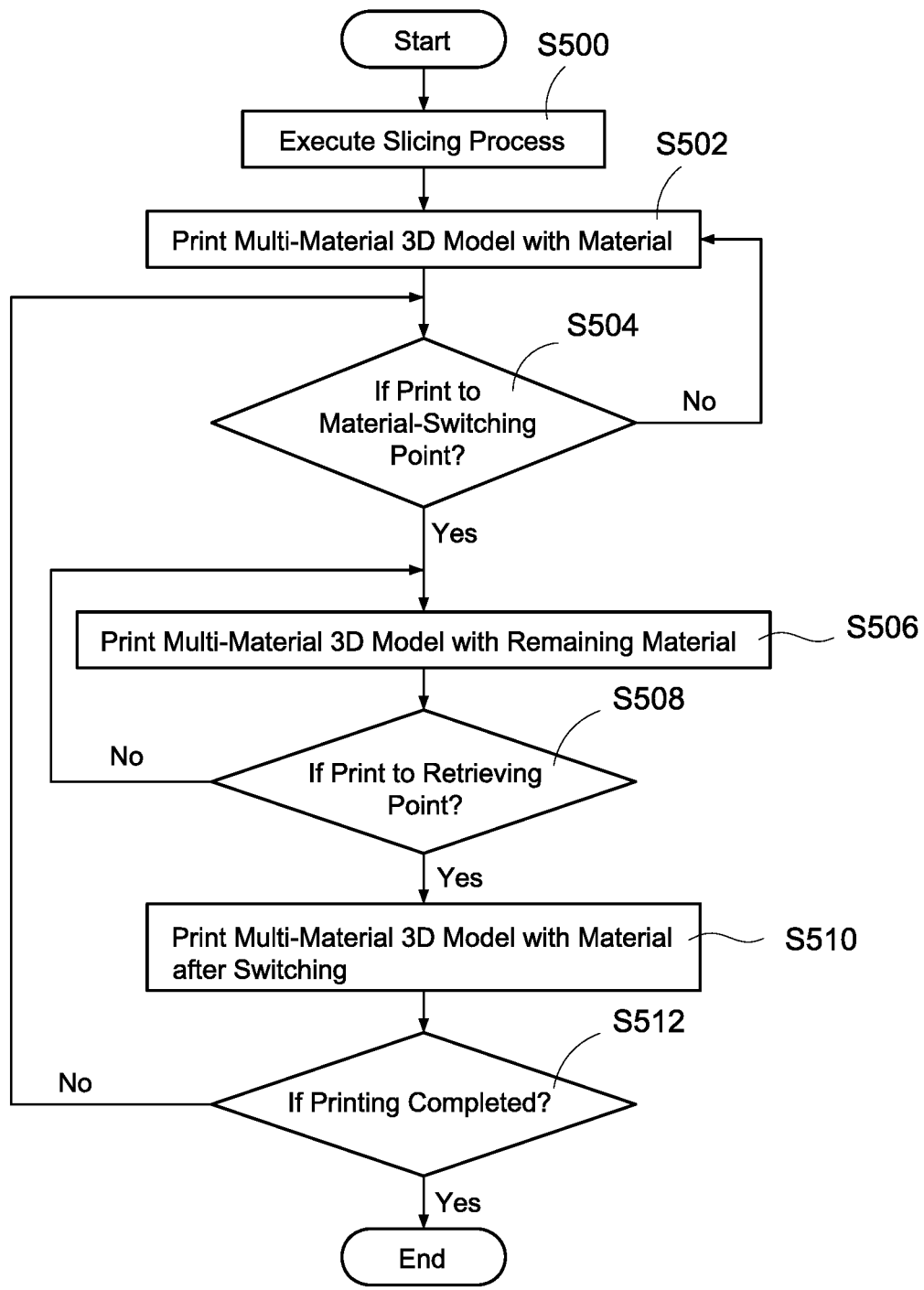
FIG. 9 is a flowchart of printing method for printing a multi-material 3D model of the fifth embodiment according to the present disclosed example.

FIG. 9 is a flowchart of printing method for printing a multi-material 3D model of the fifth embodiment according to the present disclosed example. The printing method of the embodiment comprises the following steps.

Step S500: the printing system 1 performs a slicing process on a multi-material 3D object and a subordinate 3D object respectively to generate a plurality of multi-material object slices corresponding to a multi-material 3D model and a plurality of subordinate object slice corresponding to a subordinate 3D model.

Preferably, the printing system 1 further computes at least one material-switching point of the multi-material object slices (for example the first material-switching point) during the slicing process, and at least one retrieving point of the subordinate object slices (for example first retrieving point).

Step S502: the printing system 1 selects one material from different materials (for example a first material), and uses the nozzle to print the multi-material object slices of the multi-material 3D model with the first material. Preferably, the printing system 1 prints a specific portion of the multi-material object slices (for example a first portion), wherein the colors or the composing materials of the first portion corresponds to the colors or the composing materials of the first material.

Step S504: the printing system 1 determines if the printing system 1 prints to the first material-switching point of the multi-material object slices. Specifically, the printing system 1 determines if the printing system 1 switches to another materials to continue to print another portion of the multi-material object slices (for example a second portion) according to whether the printing system 1 prints to the first material-switching point. If the printing system 1 determines the printing system 1 prints to the first material-switching point, then the printing system 1 switches to another material (for example a second material, wherein the colors or the composing materials of the second material corresponding to the colors or the composing materials of the second portion of the unprinted the multi-material object slices), and execute Step S506. Or, repeat Step S502 to continue to print with the first material.

Step S506: the printing system 1 uses the nozzle to print the subordinate object slices of the subordinate 3D model with the remaining material of the first material.

Step S508: the printing system 1 determines if the printing system 1 prints to the first retrieving point of the subordinate object slices. Specifically, the printing system 1 determines if the remaining material of the first material runs out according to whether the printing system 1 prints to the first retrieving point. If the printing system 1 determines the printing system 1 prints to the first retrieving point, execute Step S510. Or, repeat Step S506 to continue to print the subordinate object slices with the remaining material of the first material.

Step S510: the printing system 1 uses the nozzle to continue to print the second portion of the multi-material object slices of the multi-material 3D model with the second material from the first material-switching point.

Step S512: the printing system 1 determines if the printing of the multi-material 3D model is completed. If the printing system 1 determines the printing is not completed, repeat the Step S504 to be the bases for determining if the printing system 1 switches to another material (for example the first material or a third materials) to print another portion of the multi-material 3D model (for example a third portion) when the printing system 1 prints to the next material-switching point (for example a second material-switching point). Or, the printing method ends.

By printing another independent subordinate object composed of single material/compounded materials with the remaining material after the material switching, the remaining material is effectively used to generate another subordinate 3D model.

Figure 10:
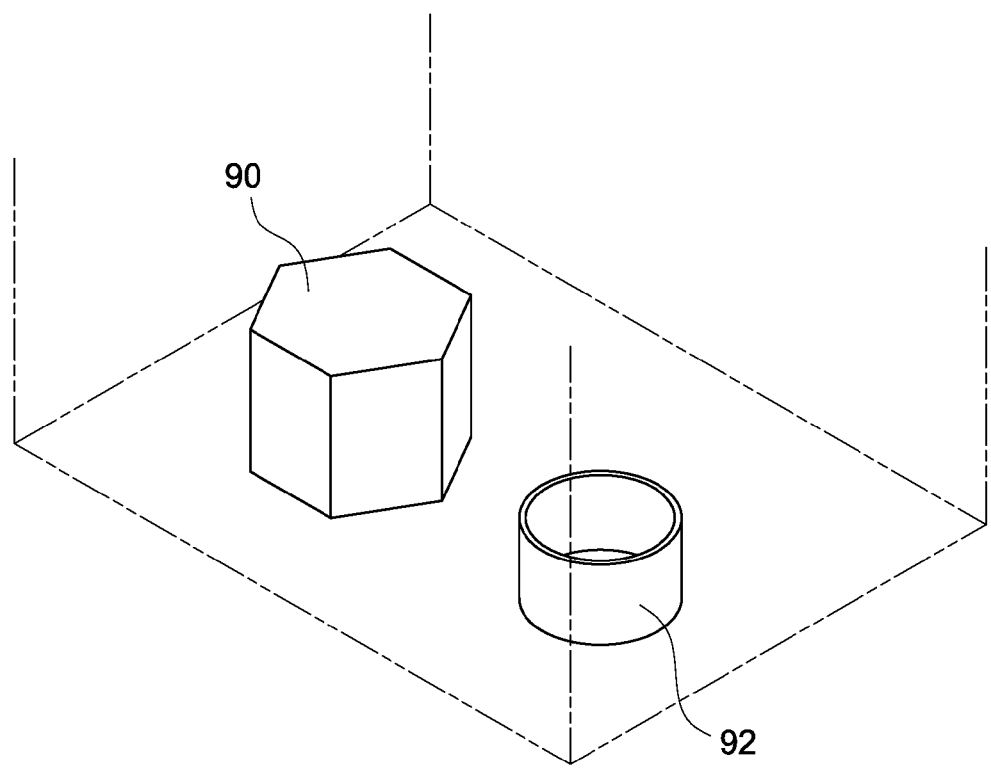
FIG. 10 is a first schematic diagram of a multi-material 3D model of the fifth embodiment according to the present disclosed example.

FIG. 10 is a first schematic diagram of a multi-material 3D model of the fifth embodiment according to the present disclosed example. As shown in the diagram, when the printing system 1 prints a multi-material 3D model 90, the printing system 1 also prints an external subordinate 3D model 92 (for example a receiving model) on the multi-material 3D model 90 with the remaining material in the embodiment.

Figure 11:
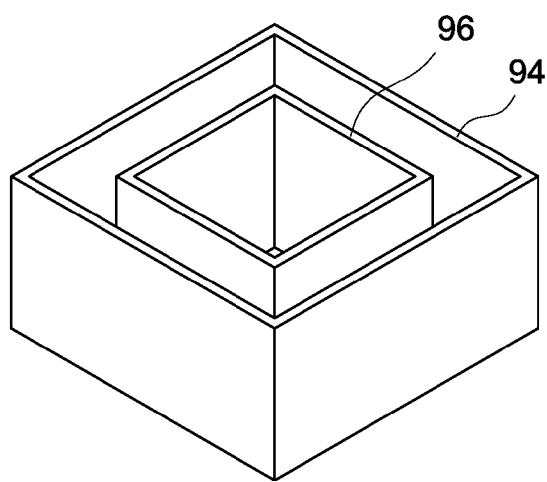
FIG. 11 is a second schematic diagram of a multi-material 3D model of the fifth embodiment according to the present disclosed example.

FIG. 11 is a second schematic diagram of a multi-material 3D model of the fifth embodiment according to the present disclosed example. As shown in the diagram, when the printing system 1 prints a multi-material 3D model 94, the printing system 1 also prints an internal subordinate 3D model 96 (for example a receiving model) on the multi-material 3D model 94 with the remaining material in the embodiment.

Figure 12:
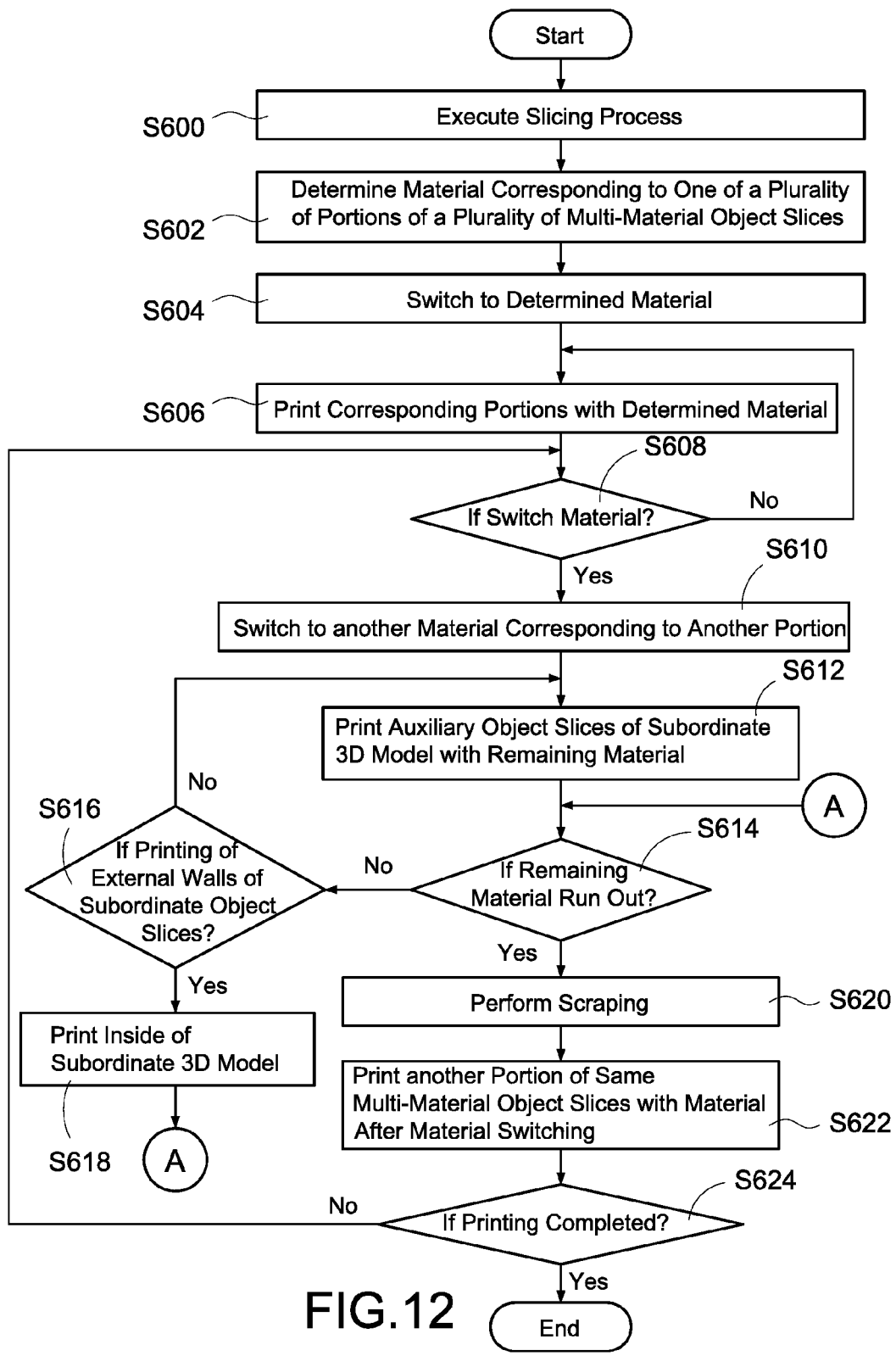
FIG. 12 is a flowchart of printing method for printing a multi-material 3D model of the sixth embodiment according to the present disclosed example.

FIG. 12 is a flowchart of printing method for printing a multi-material 3D model of the sixth embodiment according to the present disclosed example. The printing method of the embodiment comprises the following steps.

Step S600: the printing system 1 executes the slicing process on the multi-material 3D object and a subordinate 3D object to generate the multi-material object slices corresponding to the multi-material 3D objects and the subordinate object slices corresponding to the subordinate 3D objects. In addition, during the slicing process, the printing system 1 computes a plurality of material-switching points of the multi-material object slices and a plurality of retrieving points corresponding to the subordinate object slices, wherein the material-switching points respectively corresponds to the retrieving points.

Preferably, during the slicing process, the printing system 1 further computes a printing path going through the material-switching points and the retrieving points. Preferably, the printing path is the moving path when the nozzle performs printing.

Step S602: the printing system 1 selects one of the multi-material object slices (for example the unprinted lowermost multi-material object slice), selects one of a plurality of portions of the multi-material object slice (for example a first portion), and determines one material to print (for example a first material) according to the colors or the composing materials corresponding to the first portion.

Step S604: the printing system 1 switches to the determined first material.

Step S606: the printing system 1 prints the first portion of the multi-material object slice corresponding to the first material along the printing path with the first material.

Step S608: the printing system 1 determines if the printing system 1 is required to switch material to continue to print another portion of the multi-material object slice (for example a second portion) via determining if the printing system 1 prints to one of the switching points (for example first switching point). If the printing system 1 determines the printing system 1 is required to switch material, the printing system 1 switches to another material corresponding to the color or the composing materials of the second portion (for example a second material), and executes Step S610. Or, repeat Step S606 in order to print with the first material.

Step S610: the printing system 1 switches to the second material corresponding to the second portion.

Step S612: the printing system 1 prints the subordinate object slice with the remaining material of the first material and/or the second material along the printing path. Preferably, the printing system 1 prints the multi-material object slices by slices and by materials, and starts to print the subordinate object slice of the same slice height from the retrieving point corresponding to the first switching (for example first retrieving point) along the printing path with the remaining material during the intervals of swathing material between the multi-material object slices.

Step S614: the printing system 1 determines if the remaining material of the first material runs out according to whether the printing system 1 prints to another retrieving point from the first retrieving point (for example second retrieving point). If yes, execute Step S620, or execute Step S616.

Step S616: the printing system 1 further determines if the printing of the external walls of the subordinate object slice with the same slice height is completed according to whether the printing system 1 prints to another retrieving point (for example third retrieving point) along the printing path when the printing system 1 determines when the remaining material of the first material does not run out. If yes, execute Step S618, or repeat Step S612.

Specifically, if the printing system determines the estimated remaining material quantity generated by the material switching is higher than the estimated material quantity of printing one slice of the subordinate object slice during the slicing process, the printing system 1 sets up the third retrieving point inside the subordinate 3D model. Thus, the printing system 1 moves the nozzle to the inside of the subordinate 3D model internal to continue to print with the remaining material after the printing of the external wall of the auxiliary object slice with the same slice height is completed Step S618: the printing system 1 moves the nozzle to the inside of the subordinate 3D model internal along the printing path in order to continue to print the inside of the subordinate 3D model (for example printing the filling structure of the subordinate 3D model or the internal supporting structure) with the remaining material of the first material. Preferably, the subordinate 3D model is a hollow 3D model (for example a model with a receiving space), and accommodates the remaining material of the first material. Next, repeat Step S614.

It should be noted that, the Steps S614-S618 according to the embodiment are executed to run up the remaining material of the first material. Whether the printing of the subordinate object slice is completed at the same time is not the purpose of the embodiment. In other embodiments, if the printing of the subordinate object slice is required to complete at the same time, the printing system 1 executes Step S616 to assure the corresponding subordinate object slice is completed at the same time when the printing system 1 determines the remaining material runs out (the determining result is yes in the Step S614).

If the printing system 1 determines the remaining material of the first material runs out in the Step S614, the printing system 1 executes Step S620: the printing system 1 performs scraping for removing the remaining material on the nozzle of the printed subordinate object slice along the printing path. Preferably, the printing system 1 controls the nozzle to brush through the upper edge of the printed subordinate object slice and use the upper edge of the printed subordinate object slice to scrape the remaining material of the nozzle.

Step S622: the printing system 1 uses the nozzle to print the second portion of the same multi-material object slice with the second material along the printing path.

Step S624: the printing system 1 determines if the printing of the multi-material 3D model is completed. If the printing is not completed, repeats the Step S508 in order to determine if the printing system 1 switches to print the third portion of the multi-material object slice with the third material along the printing path or print another multi-material object slice along the printing path. Or, the printing method ends.

Figure 13:
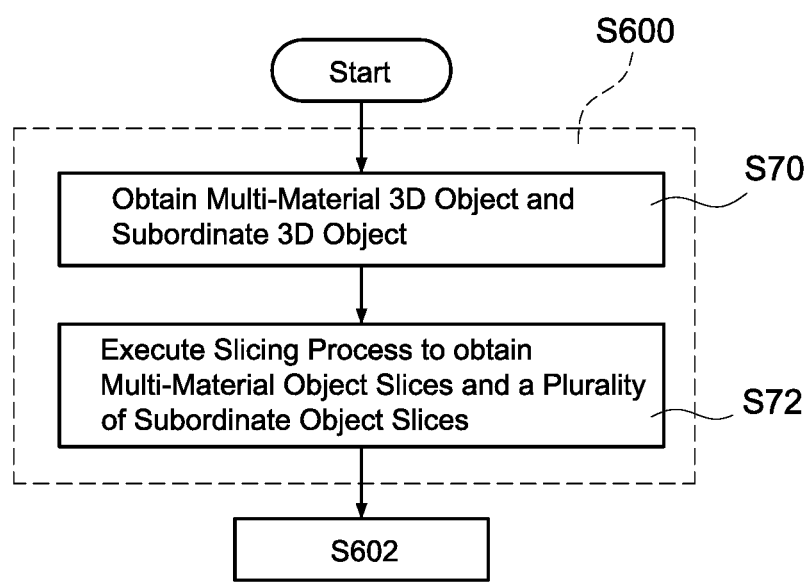
FIG. 13 is a partial flowchart of the printing method for printing a multi-material 3D model of the seventh embodiment according to the present disclosed example.

FIG. 13 is a partial flowchart of the printing method for printing a multi-material 3D model of the seventh embodiment according to the present disclosed example. Compare with the sixth embodiment, Step S600 in the present embodiment further comprises following steps.

Step S70: the printing system 1 generates the multi-material 3D object and the subordinate 3D object.

Step S72: the printing system 1 executes the slicing process on the multi-material 3D object to generate the multi-material object slices, and executes the slicing process on the subordinate 3D object to generate the subordinate object slices. Preferably, the printing system 1 further install the subordinate object slices on the internal part (if the multi-material 3D object is a hollow object shown in FIG. 10) or on the external part (if the multi-material 3D object is a solid objects as shown in FIG. 9) of the multi-material object slices. Preferably, after generate the multi-material object slices, the printing system 1 further sets up the colors, composing materials and/or corresponding materials of each portion of the multi-material object slices.

Figure 14:
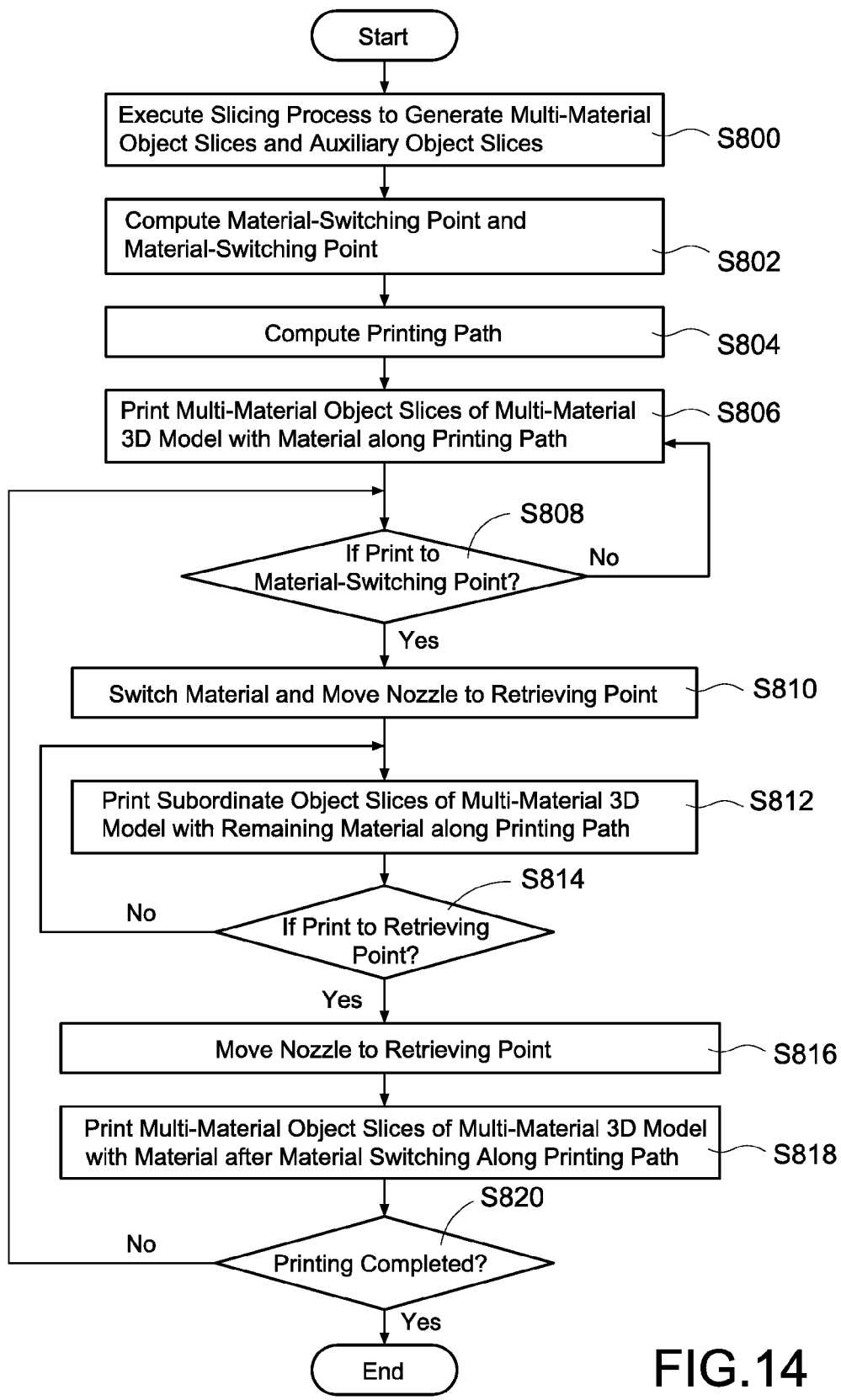
FIG. 14 is a flowchart of the printing method for printing a multi-material 3D model of the eighth embodiment according to the present disclosed example.

FIG. 14 is a flowchart of the printing method for printing a multi-material 3D model of the eighth embodiment according to the present disclosed example. The printing method of the embodiment comprises the following steps.

Step S800: the printing system 1 executes the slicing process to generate the multi-material object slices corresponding to the multi-material 3D model and the subordinate object slices corresponding to the subordinate 3D model.

Step S802: the printing system 1 computes the material-switching points of the multi-material object slices, wherein the material-switching points corresponds to the junctions of a plurality of portions of the multi-material object slices, the adjacent portions respectively correspond to different materials. In addition, the printing system 1 computes the retrieving points of the subordinate object slices where the remaining material runs out according to an estimated remaining material quantity generated by the material switching, wherein the retrieving points respectively corresponds to the material-switching points.

Step S804: the printing system 1 computing a printing path going through the material-switching points and the retrieving points. Preferably, the printing path is the moving path when the nozzle performs printing.

With the predetermined path planning, the printing system 1 smoothly without interruption moves the nozzle to the subordinate 3D model in order to print with the remaining material when the remaining material generates, and when the remaining material runs out, the printing system 1 smoothly without interruption moves the nozzle to the multi-material 3D model to print with the correct materials.

Step S806: the printing system 1 controls the nozzle to print the multi-material object slices with the first material along the printing path.

Step S808: the printing system 1 determines if the nozzle prints to and moves to one of the material-switching points along the printing path (for example first material-switching point). If yes, execute Step S810. Or, repeat Step S806.

Step S810: the printing system 1 switches to the different second material from the first material, and moves the nozzle to the retrieving points of the subordinate object slices according to the printing path. Preferably, the printing system 1 moves the nozzle to the retrieving point corresponding to the first material-switching point (for example first retrieving point).

Step S812: the printing system 1 controls the nozzle to print the subordinate object slices with the remaining material of the first the material used before the material switching along the printing path.

Step S814: the printing system 1 determines if the nozzle prints and moves to another retrieving point of the printing path (for example second retrieving point). If yes, execute Step S816. Or, repeat Step S812.

Step S816: the printing system 1 moves the nozzle back to the first material-switching point where switching the material upon determining the nozzle moves to the second retrieving point.

Step S818: the printing system 1 continues to print the multi-material object slices with the second material after the material switching along the printing path.

Step S820: the printing system 1 determines if the printing of the multi-material 3D model is completed (i.e. if the nozzle completes printing and moving along the printing path). If the printing is determined not completed, repeat the Step S808. Or, the printing method ends.

The method based on the present disclosed example prints useful objects via the remaining material after the material switching which effectively lowers the cost of the multi-material printing.

As the skilled person will appreciate, various changes and modifications can be made to the described embodiment. It is intended to include all such variations, modifications and equivalents which fall within the scope of the present disclosed example, as defined in the accompanying claims.

What is claimed is:

1. A printing method for printing a multi-material 3D model, comprising following steps:
   a) performing a slicing process on a multi-material 3D object to generate a plurality of multi-material object slices corresponding to a main body structure of a multi-material 3D model and a plurality of auxiliary object slices corresponding to an auxiliary structure of the multi-material 3D model;
   b) computing at least one material-switching point of the multi-material object slices and at least one retrieving point of the auxiliary object slices during the slicing process;
   c) printing the multi-material object slices with one of a plurality of materials;
   d) when printing to the material-switching point of the multi-material object slices, switching to another different material, and printing the auxiliary object slices with a remaining material of the material used before the material switching;
   e) when printing to the retrieving point of the auxiliary object slices, continuing to print the multi-material object slices from the material-switching point of the multi-material object slices with the material used after the material switching; and f) repeating the step d and the step e until completing the multi-material 3D model printing, wherein the step b comprises following steps:

b1) computing the material-switching points of the multi-material object slices, wherein the material-switching points corresponds to the junctions of a plurality of portions of the multi-material object slices, the adjacent portions respectively correspond to the materials of different colors or the materials of different composing materials;

b2) computing the retrieving points of the auxiliary object slices according to an estimated remaining material quantity, wherein the retrieving points respectively corresponds to the material-switching points; and b3) computing a printing path going through the material-switching points and the retrieving points.

2. The printing method for printing a multi-material 3D model of claim 1, wherein the auxiliary structure is an internal supporting structure or an external supporting structure of the multi-material 3D model.

3. The printing method for printing a multi-material 3D model of claim 1, wherein the step a comprises following steps:

a1) obtaining the multi-material 3D object;

a2) performing the slicing process on the multi-material 3D object to generate the multi-material object slices and the auxiliary object slices; and a3) sending a warning when determining a total quantity estimate of the remaining material exceeds total quantity estimate of the material of the auxiliary object slices.

4. The printing method for printing a multi-material 3D model of claim 1, wherein the step c comprises a step c1: controlling a nozzle to print the multi-material object slices along the printing path; the step d comprises a step d1: when the nozzle moving to one of the material-switching points along the printing path, switching to another different material, moving the nozzle to the corresponding retrieving point along the printing path, and controlling the nozzle to print the auxiliary object slices along the printing path with the remaining materials of the materials used before the material switching.

5. The printing method for printing a multi-material 3D model of claim 4, wherein the step e comprises a step e1: when the nozzle moving to another retrieving point along the printing path, moving the nozzle along the printing path to the material-switching point upon switching the materials, and continuing to print the multi-material object slices along the printing path with the materials after the material switching.

6. The printing method for printing a multi-material 3D model of claim 1, wherein the step c is determining the material corresponding one of a plurality of portions of the multi-material object slices, and printing the corresponding portion of the multi-material object slices with the materials along a printing path determined during the slicing process, the printing path going through the material-switching point and the retrieving point; the step e is continuing to print another portion of the same multi-material object slices along the printing path.

7. The printing method for printing a multi-material 3D model of claim 6, wherein the step d comprises following steps:

d2) when printing to the material-switching point of the multi-material object slices along the printing path, switching to another material corresponding to another portion of the same multi-material object slice; and d3) printing the auxiliary object slice of the same slice height along the printing path with the remaining materials of the materials used before the material switching.

8. The printing method for printing a multi-material 3D model of claim 7, wherein the step d further comprises a step d4: when the remaining materials of the materials used before the material switching runs out and the printing of the auxiliary object slices is not completed, continuing to print the auxiliary object slices along the printing path with the materials after the material switching.

9. The printing method for printing a multi-material 3D model of claim 1, wherein the method comprises a step e0 before the step e: performing scraping for removing the remaining material of a nozzle on the printed auxiliary object slices along a printing path determined during the slicing process.

10. A printing method for printing a multi-material 3D model, comprising following steps:

a) performing a slicing process on a multi-material 3D object and a subordinate 3D object respectively to generate a plurality of multi-material object slices corresponding to a multi-material 3D model and a plurality of subordinate object slices corresponding to a subordinate 3D model;

b) computing at least one material-switching point of the multi-material object slices and at least one retrieving point of the subordinate object slices during the slicing process;

c) printing the multi-material object slices with one of a plurality of materials;

d) when printing to the material-switching point of the multi-material object slices, switching to another different material, and printing the subordinate object slices with a remaining material of the material used before the material switching;

e) when printing to the retrieving point of the subordinate object slices, continuing to print the multi-material object slices from the material-switching point of the multi-material object slices with the material used after the material switching; and f) repeating the step d and the step e until completing the multi-material 3D model printing, wherein the step b comprises following steps:

b1) computing the material-switching points of the multi-material object slices, wherein the material-switching points corresponds to the junctions of a plurality of portions of the multi-material object slices, the adjacent portions respectively correspond to the materials of different colors or the materials of different composing materials;

b2) computing the retrieving points of the subordinate object slices according to an estimated remaining material quantity, wherein the retrieving points respectively corresponds to the material-switching points; and b3) computing a printing path going through the material-switching points and the retrieving points.

11. The printing method for printing a multi-material 3D model of claim 10, wherein the multi-material 3D object is a hollow object; the step a is installing the subordinate object slices inside the multi-material object slices.

12. The printing method for printing a multi-material 3D model of claim 10, wherein the step a is individually installing the subordinate object slices on the outside of the multi-material object slices.

13. The printing method for printing a multi-material 3D model of claim 10, wherein the step c comprises a step c1: controlling a nozzle to print the multi-material object slices along the printing path; the step d comprises a step d1: when the nozzle moving to one of the material-switching points along the printing path, switching to another different material, moving the nozzle to the corresponding retrieving point along the printing path, and controlling the nozzle to print the subordinate object slices along the printing path with the remaining materials of the materials used before the material switching.

14. The printing method for printing a multi-material 3D model of claim 13, wherein the step e comprises a step e1: when the nozzle moving to another retrieving point along the printing path, moving the nozzle along the printing path to the material-switching point upon switching the materials, and continuing to print the multi-material object slices along the printing path with the materials used after the material switching.

15. The printing method for printing a multi-material 3D model of claim 10, wherein the step c is determining the material corresponding to one of a plurality of portions of the multi-material object slices, and printing the corresponding portion of the multi-material object slices with the materials along a printing path determined during the slicing process, the printing path going through the material-switching point and the retrieving point; the step e is continuing to print another portion of the multi-material object slices along the printing path.

16. The printing method for printing a multi-material 3D model of claim 15, wherein the step d comprises following steps:
   d2) when printing to the material-switching point of the multi-material object slices along the printing path, switching to another material corresponding to another portion of the same multi-material object slices; and
   d3) printing the subordinate object slice of the same slice height along the printing path with the remaining materials of the materials used before the material switching.

17. The printing method for printing a multi-material 3D model of claim 16, wherein the subordinate 3D model is a model with receiving space; the step d further comprises a step d4: printing the walls of the subordinate 3D model along the printing path with the remaining materials of the materials used before the material switching, and when the printing of the subordinate 3D model completed, continuing to print the inside of the subordinate 3D model along the printing path.

18. The printing method for printing a multi-material 3D model of claim 17, wherein the method comprises a step e0 before the step e: performing scraping for removing the remaining material of a nozzle on the printed subordinate object slices along the printing path.

* * * * *